(12) United States Patent
Katz

(10) Patent No.: US 12,556,127 B1
(45) Date of Patent: Feb. 17, 2026

(54) SOLAR PANEL MOUNTING CONFIGURATION

(71) Applicant: Tamarack Solar Products, Inc., Arcata, CA (US)

(72) Inventor: David Katz, Arcata, CA (US)

(73) Assignee: Tamarack Solar Products, Inc., Arcata, CA (US)

( * ) Notice: Subject to any disclaimer, the term of this patent is extended or adjusted under 35 U.S.C. 154(b) by 0 days.

(21) Appl. No.: 16/117,813

(22) Filed: Aug. 30, 2018

Related U.S. Application Data

(60) Provisional application No. 62/553,347, filed on Sep. 1, 2017.

(51) Int. Cl.
| | |
|---|---|
| *H02S 20/23* | (2014.01) |
| *F24S 25/30* | (2018.01) |
| *F24S 25/636* | (2018.01) |
| *F24S 25/65* | (2018.01) |
| *F24S 25/70* | (2018.01) |

(52) U.S. Cl.
CPC .............. *H02S 20/23* (2014.12); *F24S 25/30* (2018.05); *F24S 25/636* (2018.05); *F24S 25/65* (2018.05); *F24S 25/70* (2018.05)

(58) Field of Classification Search
CPC ......... Y02E 10/47; Y02E 10/50; Y02B 10/12; Y02B 10/10; H02S 20/23; H02S 30/10; H02S 20/24; H02S 20/00; H02S 20/22; F24S 25/636; F24S 25/20; F24S 25/70; F24S 2025/807; F24S 2025/6008; F24S 25/61; F24S 25/30; F24S 25/65; E04H 17/1447; E04H 17/1452

USPC ........................................................ 248/237
See application file for complete search history.

(56) References Cited

U.S. PATENT DOCUMENTS

| | | | | |
|---|---|---|---|---|
| 3,071,350 | A | * | 1/1963 | Opie .................... E04F 11/1812 248/222.13 |
| 3,136,530 | A | * | 6/1964 | Case ......................... F16B 7/22 256/65.1 |
| 3,483,910 | A | * | 12/1969 | Van Huffel ........... F16B 37/046 411/84 |
| 3,842,564 | A | * | 10/1974 | Brown .................. E04F 19/026 52/717.03 |

(Continued)

FOREIGN PATENT DOCUMENTS

| | | | | |
|---|---|---|---|---|
| AU | 2012101058 A4 | * | 10/2012 | ............ F24S 25/636 |
| CN | 201893350 U | * | 7/2011 | ............. Y02E 10/50 |

(Continued)

OTHER PUBLICATIONS

Machine Translation of EP 2267320 (Year: 2010).*
Machine Translation of WO 2010124680 (Year: 2010).*
Machine Translation of EP-2341254 (Year: 2011).*

*Primary Examiner* — Taylor Morris
(74) *Attorney, Agent, or Firm* — Alston & Bird LLP

(57) ABSTRACT

Solar panels may be mounted relative to a support structure via a solar panel mounting system comprising at least one mounting foot, at least one mount adapter, at least one mounting rail and at least one channel nut. The solar panel may be fastened to the channel nut, which is positioned within an interior channel of the mounting rail. A mounting feature of the mounting rail is clamped between a connecting member of the mount adapter and a portion of the mounting foot, and the mounting foot is fastened against the support structure.

12 Claims, 14 Drawing Sheets

(56) References Cited

U.S. PATENT DOCUMENTS

| | | | | |
|---|---|---|---|---|
| 4,073,113 | A * | 2/1978 | Oudot | E04B 2/766 403/189 |
| 4,159,758 | A * | 7/1979 | Courson | B66B 23/22 403/313 |
| 4,369,953 | A * | 1/1983 | Greiner | E04H 17/143 256/73 |
| 4,410,298 | A * | 10/1983 | Kowalski | F16B 37/046 411/104 |
| 4,645,393 | A * | 2/1987 | Pletcher | F16B 37/046 411/113 |
| 5,186,314 | A * | 2/1993 | Clopton | B65G 21/06 198/860.1 |
| 5,209,619 | A * | 5/1993 | Rinderer | F16B 37/045 411/85 |
| 5,628,598 | A * | 5/1997 | Hofle | F16B 37/045 411/85 |
| 5,938,184 | A * | 8/1999 | DeSouza | E04H 17/1417 256/65.06 |
| 6,672,018 | B2 * | 1/2004 | Shingleton | F24S 25/636 52/173.3 |
| 6,959,517 | B2 * | 11/2005 | Poddany | F24S 25/20 52/173.3 |
| 7,406,800 | B2 * | 8/2008 | Cinnamon | F24S 25/67 52/173.3 |
| 7,592,537 | B1 * | 9/2009 | West | F24S 25/20 136/251 |
| 7,634,875 | B2 * | 12/2009 | Genschorek | F24S 25/636 52/843 |
| 7,748,175 | B2 * | 7/2010 | Liebendorfer | F24S 25/70 52/173.3 |
| 7,814,899 | B1 * | 10/2010 | Port | F24S 25/636 52/173.3 |
| 7,992,841 | B2 * | 8/2011 | Petta | E04F 11/1817 24/593.1 |
| 8,051,976 | B2 * | 11/2011 | Koeda | B65G 21/06 198/837 |
| 8,128,044 | B2 * | 3/2012 | Liebendorfer | F24S 25/613 52/460 |
| 8,250,829 | B2 * | 8/2012 | McPheeters | F16M 13/02 52/710 |
| 8,356,446 | B2 * | 1/2013 | Takeda | E04B 1/5831 52/79.12 |
| 8,387,319 | B1 * | 3/2013 | Gilles-Gagnon | F24S 25/615 52/173.3 |
| 8,413,944 | B2 * | 4/2013 | Harberts | F24S 25/61 248/500 |
| 8,418,688 | B2 * | 4/2013 | King | F24S 25/20 126/621 |
| 8,539,719 | B2 * | 9/2013 | McPheeters | F24S 25/636 52/27 |
| 8,567,030 | B2 * | 10/2013 | Koch | F24S 25/61 29/281.1 |
| 8,595,996 | B2 * | 12/2013 | Korman | H02S 30/10 52/173.3 |
| 8,595,997 | B2 * | 12/2013 | Wu | H02S 20/10 52/173.3 |
| 8,640,401 | B2 * | 2/2014 | Hong | H02S 20/23 52/173.3 |
| 8,695,290 | B1 * | 4/2014 | Kim | F24S 25/67 52/173.3 |
| 8,813,460 | B2 * | 8/2014 | Cinnamon | H02S 30/10 52/747.1 |
| 8,839,575 | B1 * | 9/2014 | Liu | H02S 20/23 52/173.3 |
| 8,984,818 | B2 * | 3/2015 | McPheeters | H02S 20/20 52/173.3 |
| 9,074,372 | B2 * | 7/2015 | Laurin | F24S 25/67 |
| 9,080,792 | B2 * | 7/2015 | Patton | F24S 25/61 |
| 9,147,986 | B2 * | 9/2015 | Redel | F24S 25/634 |
| 9,160,273 | B2 * | 10/2015 | Schuit | F16B 2/065 |
| 9,175,881 | B2 * | 11/2015 | Schrock | F24S 25/61 |
| 9,243,817 | B2 * | 1/2016 | West | F24S 25/636 |
| 9,347,213 | B1 * | 5/2016 | Zhang | E04C 3/09 |
| 9,453,592 | B2 * | 9/2016 | Zhang | F16L 3/1033 |
| 9,506,600 | B1 * | 11/2016 | Li | F24S 25/65 |
| 9,525,088 | B2 * | 12/2016 | Urban | F24S 25/615 |
| 9,577,571 | B2 * | 2/2017 | Atia | F24S 25/613 |
| 9,584,062 | B2 * | 2/2017 | Ganshaw | F24S 25/35 |
| 9,638,223 | B2 * | 5/2017 | Redel | F24S 25/37 |
| 9,660,567 | B2 * | 5/2017 | Goehringer | F16M 11/00 |
| 9,813,013 | B2 * | 11/2017 | McPheeters | F24S 25/70 |
| 9,813,015 | B1 * | 11/2017 | Kapla | H02S 30/10 |
| 9,819,303 | B2 * | 11/2017 | Ash | H02S 20/23 |
| 9,853,593 | B2 * | 12/2017 | Cinnamon | H01L 31/042 |
| 9,863,665 | B2 * | 1/2018 | West | F24S 25/65 |
| 9,893,677 | B1 * | 2/2018 | Liu | H02S 20/23 |
| 9,923,511 | B2 * | 3/2018 | Xie | H02S 30/10 |
| 9,954,479 | B1 * | 4/2018 | Atia | H02S 20/23 |
| 9,973,142 | B2 * | 5/2018 | Stearns | E04D 13/10 |
| 10,090,800 | B2 * | 10/2018 | McPheeters | F16B 2/185 |
| 10,097,133 | B2 * | 10/2018 | Aliabadi | F24S 25/636 |
| 10,177,704 | B2 * | 1/2019 | Kapla | F16B 5/126 |
| 10,205,418 | B2 * | 2/2019 | Nayar | F24S 25/613 |
| 10,205,419 | B2 * | 2/2019 | McPheeters | H02S 20/30 |
| 10,218,305 | B1 * | 2/2019 | Schrock | H02S 20/20 |
| 10,218,306 | B2 * | 2/2019 | Ash | H02S 30/10 |
| 10,236,821 | B1 * | 3/2019 | Atia | H02S 20/23 |
| 10,302,333 | B2 * | 5/2019 | McPheeters | F16B 2/12 |
| 10,340,837 | B2 * | 7/2019 | Wildes | F24S 25/636 |
| 10,340,838 | B2 * | 7/2019 | Schuit | F24S 25/636 |
| 10,396,705 | B2 * | 8/2019 | Anderson | H02S 20/23 |
| 10,622,935 | B1 * | 4/2020 | Liu | H02S 30/00 |
| 10,663,195 | B2 * | 5/2020 | Ash | H02S 20/23 |
| 11,296,648 | B1 * | 4/2022 | Jasmin | F16B 2/06 |
| 11,377,840 | B2 * | 7/2022 | Stephan | E04C 3/07 |
| 11,757,400 | B1 * | 9/2023 | Jasmin | H02S 20/23 248/237 |
| 11,929,704 | B1 * | 3/2024 | Jasmin | F24S 25/00 |
| 11,979,108 | B2 * | 5/2024 | Jasmin | H02S 20/23 |
| 2005/0257453 | A1 * | 11/2005 | Cinnamon | H02S 20/23 52/173.3 |
| 2008/0244881 | A1 * | 10/2008 | Zante | H02S 20/23 24/530 |
| 2008/0310913 | A1 * | 12/2008 | Urban | H02S 20/23 403/404 |
| 2009/0232616 | A1 * | 9/2009 | Sekreta | F16B 35/06 411/107 |
| 2010/0229367 | A1 * | 9/2010 | Franklin | F24S 25/636 29/464 |
| 2010/0269447 | A1 * | 10/2010 | Schuit | F24S 25/33 52/698 |
| 2010/0276558 | A1 * | 11/2010 | Faust | F24S 25/12 248/316.1 |
| 2011/0000544 | A1 * | 1/2011 | West | F24S 25/16 136/259 |
| 2011/0138585 | A1 * | 6/2011 | Kmita | F24S 25/636 24/522 |
| 2011/0233157 | A1 * | 9/2011 | Kmita | H02S 20/24 211/41.1 |
| 2011/0247295 | A1 * | 10/2011 | Stearns | F24S 25/61 248/237 |
| 2011/0302857 | A1 * | 12/2011 | Mcclellan | F24S 40/44 52/173.3 |
| 2012/0001046 | A1 * | 1/2012 | Schmotz | F16B 2/065 248/316.1 |
| 2012/0097807 | A1 * | 4/2012 | Rees | F24S 25/30 248/121 |
| 2012/0187267 | A1 * | 7/2012 | Hudson | F24S 25/613 248/292.14 |
| 2012/0193310 | A1 * | 8/2012 | Fluhrer | F24S 25/30 248/316.4 |
| 2012/0234378 | A1 * | 9/2012 | West | F24S 25/632 136/251 |
| 2013/0291479 | A1 * | 11/2013 | Schaefer | H01R 13/648 52/745.21 |
| 2013/0320175 | A1 * | 12/2013 | Kemple | F24S 25/65 248/316.1 |
| 2014/0026946 | A1 * | 1/2014 | West | H02S 20/00 136/251 |

(56) References Cited

U.S. PATENT DOCUMENTS

| | | | | |
|---|---|---|---|---|
| 2014/0041202 | A1* | 2/2014 | Schnitzer | F24S 25/35 |
| | | | | 29/525.01 |
| 2014/0110543 | A1* | 4/2014 | Aliabadi | H02S 20/23 |
| | | | | 248/201 |
| 2014/0202525 | A1* | 7/2014 | Janssens | F16M 13/02 |
| | | | | 136/251 |
| 2014/0319307 | A1* | 10/2014 | Schrock | F16B 9/023 |
| | | | | 248/542 |
| 2014/0341645 | A1* | 11/2014 | Liu | F16B 2/065 |
| | | | | 403/311 |
| 2015/0060619 | A1* | 3/2015 | Krannich | F24S 25/613 |
| | | | | 248/237 |
| 2015/0078806 | A1* | 3/2015 | Schrock | F24S 25/33 |
| | | | | 403/13 |
| 2015/0168021 | A1* | 6/2015 | Wentworth | F24S 25/636 |
| | | | | 52/173.3 |
| 2015/0180404 | A1* | 6/2015 | Braunstein | H02S 20/23 |
| | | | | 136/251 |
| 2016/0043687 | A1* | 2/2016 | McPheeters | H02S 20/30 |
| | | | | 211/162 |
| 2016/0043689 | A1* | 2/2016 | McPheeters | F24S 25/61 |
| | | | | 248/231.31 |
| 2016/0054030 | A1* | 2/2016 | Ilzhöfer | F24S 25/632 |
| | | | | 248/237 |
| 2016/0087576 | A1* | 3/2016 | Johansen | E04D 1/36 |
| | | | | 52/58 |
| 2016/0111995 | A1* | 4/2016 | Nayar | F24S 25/613 |
| | | | | 211/41.1 |
| 2016/0111999 | A1* | 4/2016 | Stapleton | F24S 25/632 |
| | | | | 52/173.3 |
| 2016/0112000 | A1* | 4/2016 | McPheeters | F24S 25/61 |
| | | | | 52/698 |
| 2016/0134230 | A1* | 5/2016 | Meine | H02S 20/23 |
| | | | | 52/698 |
| 2016/0285406 | A1* | 9/2016 | Nishio | H02S 30/10 |
| 2016/0308486 | A1* | 10/2016 | Atia | F24S 25/613 |
| 2016/0344338 | A1* | 11/2016 | Schutz | F24S 25/632 |
| 2017/0063301 | A1* | 3/2017 | Ash | H02S 20/00 |
| 2017/0302221 | A1* | 10/2017 | Jasmin | F24S 25/65 |
| 2017/0353143 | A1* | 12/2017 | Stearns | F24S 25/634 |
| 2018/0026577 | A1* | 1/2018 | Gaveau | F24S 25/70 |
| | | | | 136/251 |
| 2018/0048261 | A1* | 2/2018 | Franklin | H02S 30/10 |
| 2018/0062571 | A1* | 3/2018 | Ash | H02S 20/23 |
| 2018/0106289 | A1* | 4/2018 | Ash | F24S 25/615 |
| 2018/0238589 | A1* | 8/2018 | Ash | H02S 20/23 |
| 2018/0316300 | A1* | 11/2018 | Kapla | F24S 25/61 |
| 2018/0323744 | A1* | 11/2018 | Hudson | F24S 25/33 |
| 2019/0178274 | A1* | 6/2019 | Katz | H02S 20/20 |
| 2020/0014327 | A1* | 1/2020 | Rodrigues | E04D 12/006 |
| 2020/0116191 | A1* | 4/2020 | Uppu | F24S 25/61 |
| 2021/0102577 | A1* | 4/2021 | Kovacs | F16B 37/046 |
| 2021/0285596 | A1* | 9/2021 | Affentranger, Jr. | F16M 13/02 |
| 2022/0345074 | A1* | 10/2022 | Neal | F24S 25/33 |
| 2023/0228372 | A1* | 7/2023 | Stephan | F24S 25/636 |
| | | | | 29/525.01 |
| 2024/0227688 | A1* | 7/2024 | Morano | F24S 25/613 |

FOREIGN PATENT DOCUMENTS

| | | | | |
|---|---|---|---|---|
| CN | 203085581 | U * | 7/2013 | Y02E 10/50 |
| CN | 203300659 | U * | 11/2013 | F24J 2/5203 |
| CN | 203491956 | U * | 3/2014 | Y02E 10/50 |
| CN | 203562992 | U * | 4/2014 | F24J 2/5247 |
| CN | 218771874 | U * | 3/2023 | H02S 20/23 |
| DE | 202009011708 | U1 * | 4/2010 | F16B 37/045 |
| DE | 202009016197 | U1 * | 4/2010 | F24J 2/5203 |
| DE | 202010001854 | U1 * | 10/2010 | F24J 2/5205 |
| DE | 202009018641 | U1 * | 7/2012 | F24J 2/5205 |
| DE | 102012009834 | A1 * | 12/2012 | F16B 7/0473 |
| DE | 202014101153 | U1 * | 6/2014 | F16B 2/065 |
| DE | 102021110332 | A1 * | 10/2022 | H02S 20/23 |
| DE | 202023106645 | U1 * | 1/2024 | F24S 25/613 |
| EP | 2256353 | A2 * | 12/2010 | F16B 7/0473 |
| EP | 2267320 | A1 * | 12/2010 | F16B 37/045 |
| EP | 2341254 | A2 * | 7/2011 | F16B 37/045 |
| EP | 2381188 | A2 * | 10/2011 | F24J 2/4614 |
| FR | 3037744 | A1 * | 12/2016 | H02S 20/23 |
| JP | 7518520 | B1 * | 7/2024 | H02S 20/30 |
| KR | 20220148489 | A * | 11/2022 | F16B 5/02 |
| WO | WO-2010124680 | A2 * | 11/2010 | F24J 2/5203 |
| WO | WO-2012168384 | A1 * | 12/2012 | F24J 2/5245 |
| WO | WO-2013163667 | A1 * | 11/2013 | F24J 2/5203 |
| WO | WO-2017019971 | A1 * | 2/2017 | H02S 20/25 |
| WO | WO-2021061866 | A1 * | 4/2021 | F24S 25/61 |
| WO | WO-2021067933 | A1 * | 4/2021 | E04D 13/00 |

* cited by examiner

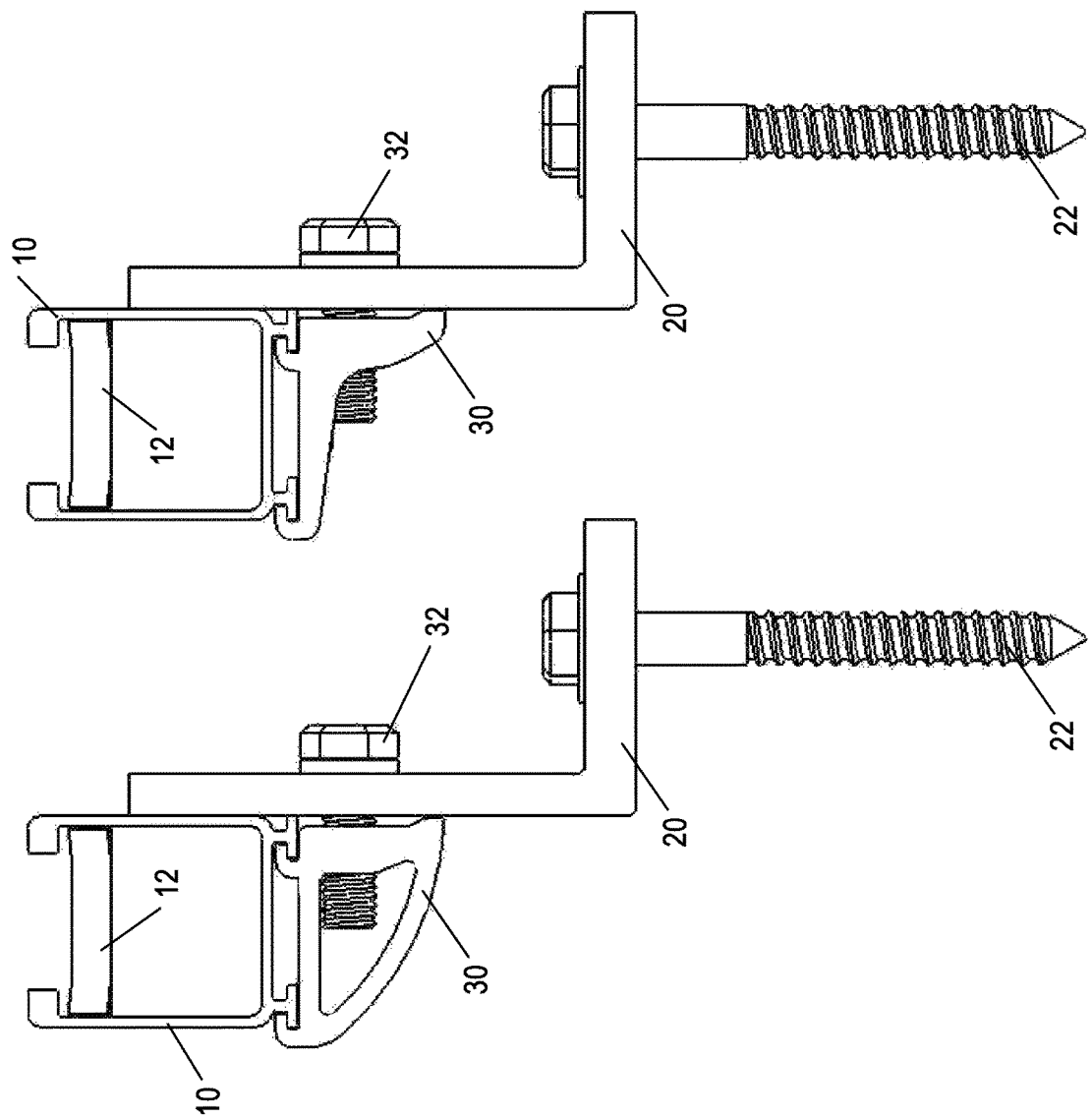

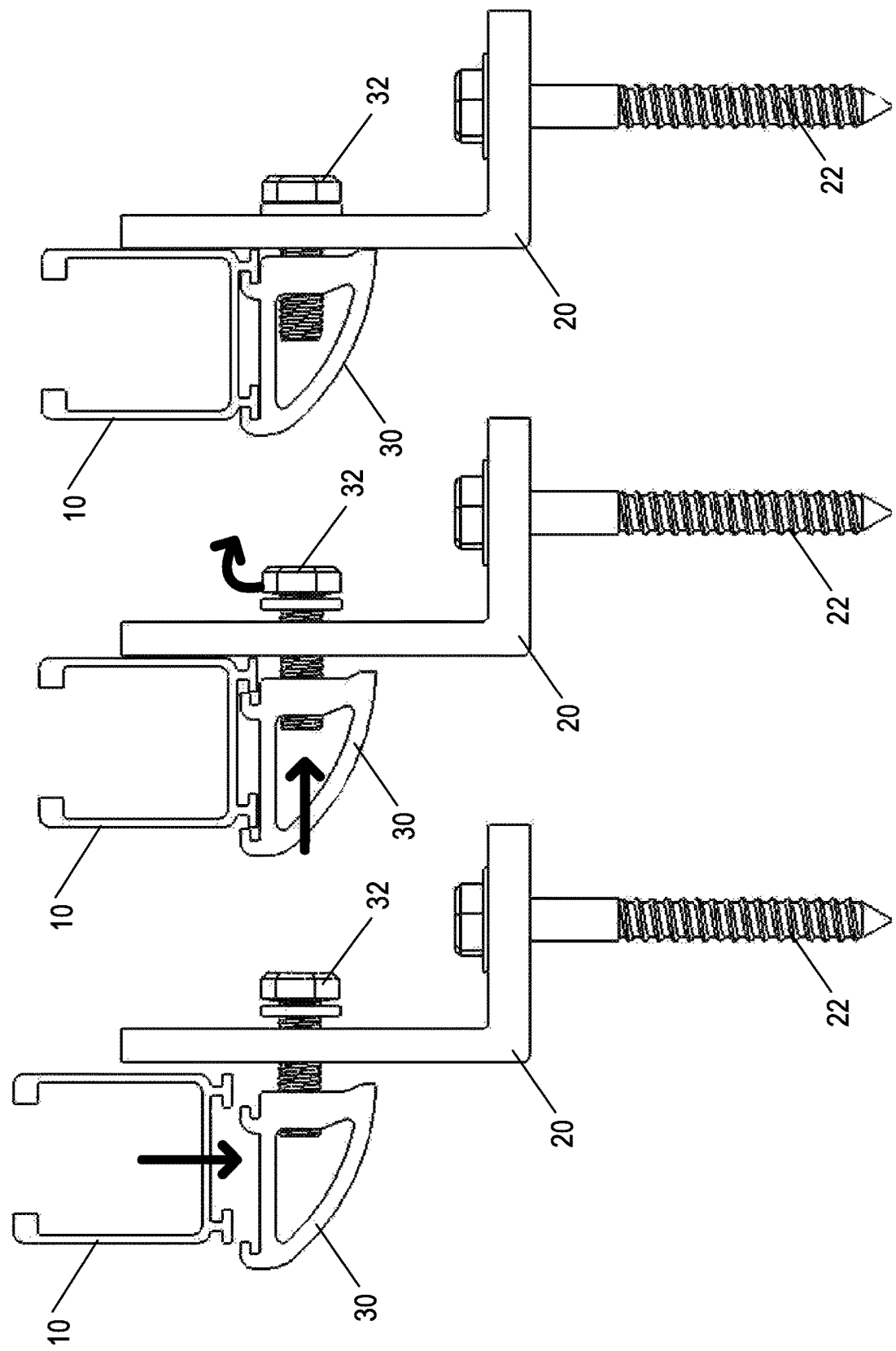

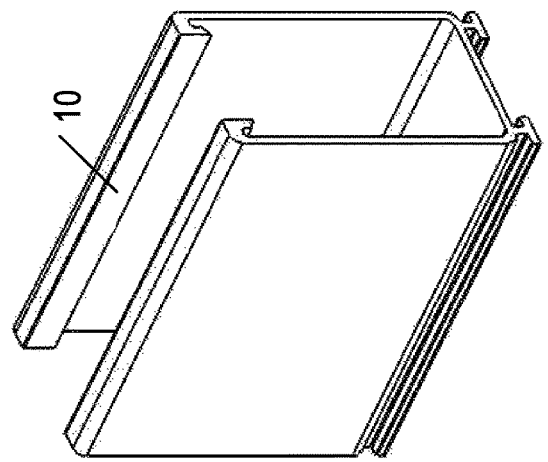
FIG. 10A
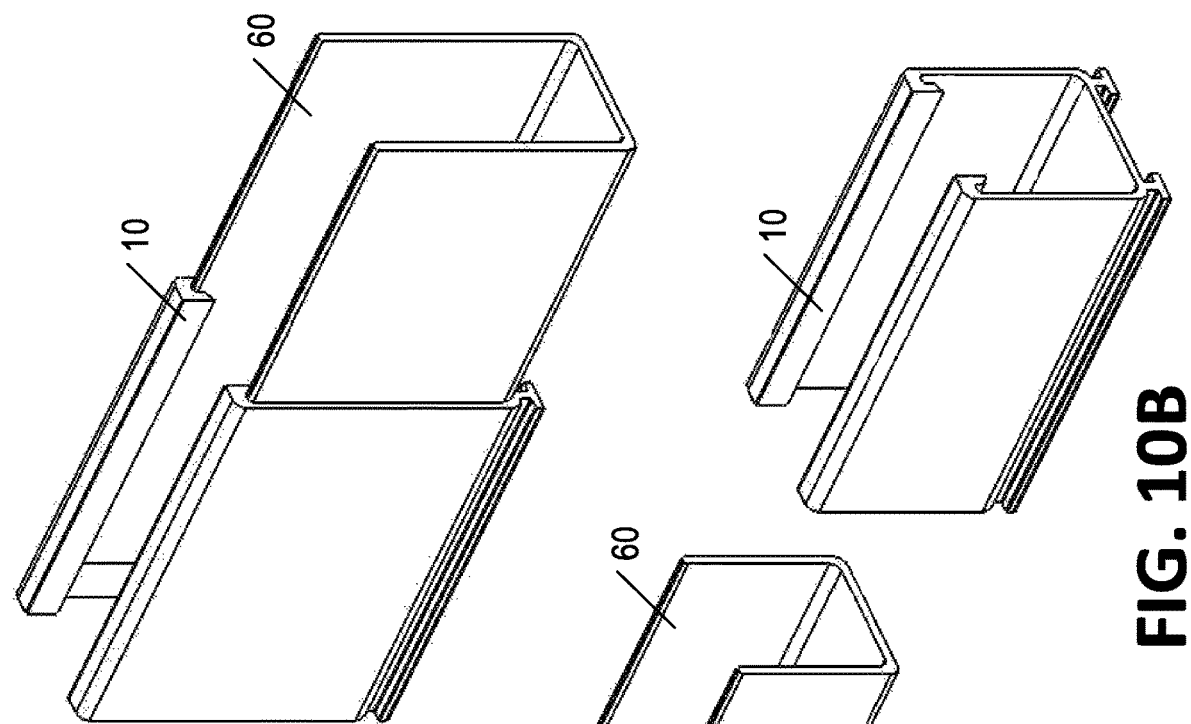
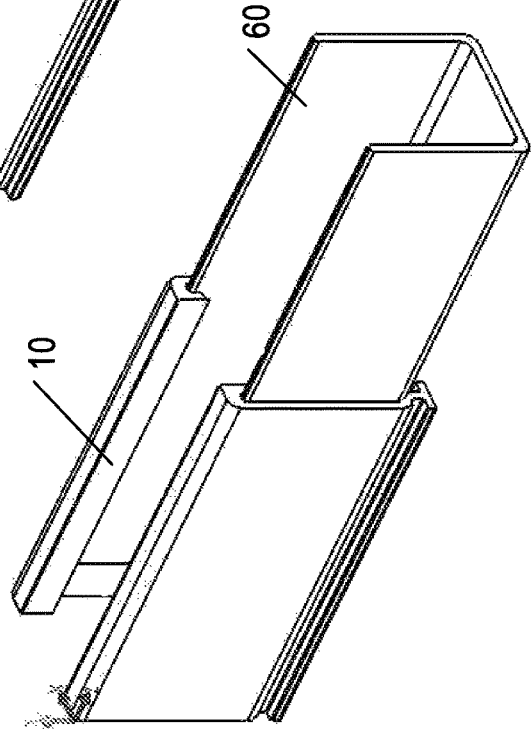
FIG. 10B

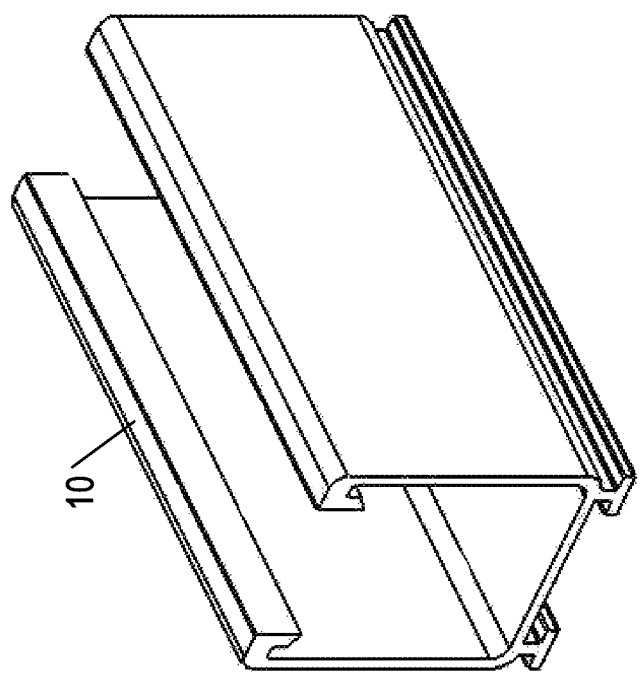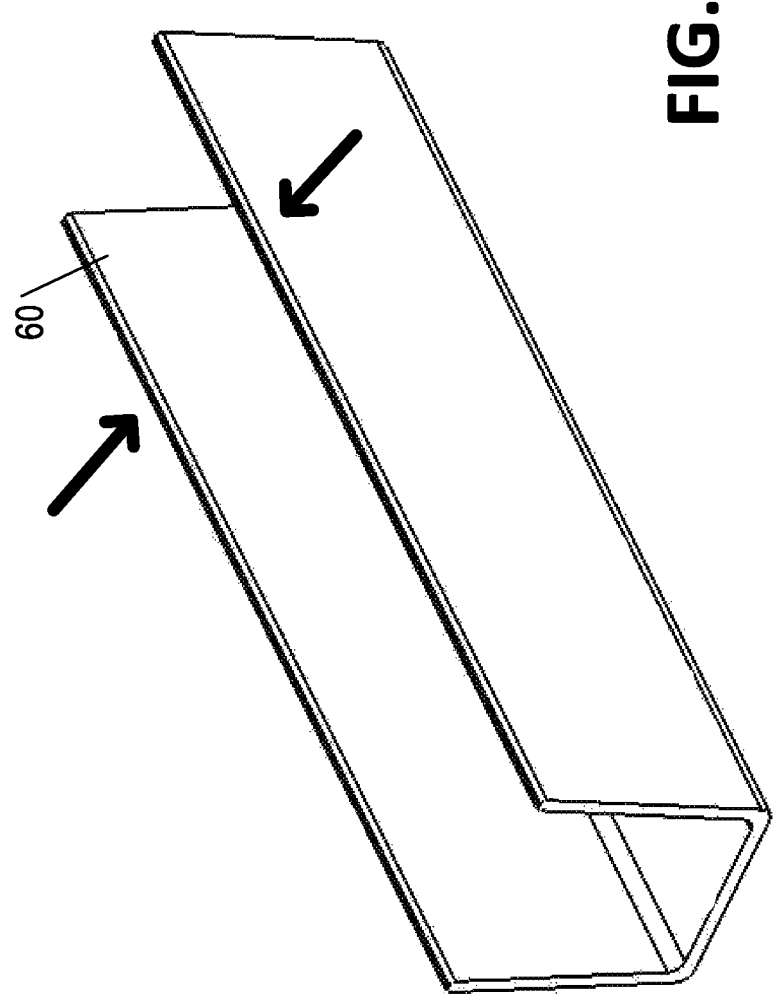
FIG. 13

SOLAR PANEL MOUNTING CONFIGURATION

CROSS-REFERENCE TO RELATED APPLICATIONS

This patent application claims priority to Provisional Appl. Ser. No. 62/553,347, filed Sep. 1, 2017 which is incorporated herein by reference in its entirety.

BACKGROUND

Solar panels, which typically comprise large sheets of glass surrounded by a rigid frame (e.g., aluminum) and two electrical leads extending from each panel that are electrically connected to an electrical storage device (e.g., a battery). Due to the very nature of solar panels and the mechanism through which they generate electricity, solar panels are often secured to building roofs or other supportive structures where the solar panels are exposed to direct sunlight for a maximum amount of time during each day.

As solar energy becomes an increasingly popular source of electrical power both on and off traditional power grids, the need for installation systems that can be quickly and easily utilized to secure solar panels to respective supportive structures has become increasingly important.

BRIEF SUMMARY

Solar panels may be secured relative to a support structure via a solar panel mounting system according to various embodiments, which utilizes rails having open interior channels that may be utilized for guiding connecting wires, cables, and/or the like therethrough. The result is a clean installation with minimal visible wires, cables, and/or the like. Moreover, the described configuration is characterized by improved strength relative to existing mounting configurations while simultaneously minimizing the number of holes required to be drilled through a support structure. Moreover, the described mounting configuration may be assembled during installation of solar panels in a much shorter period of time relative to existing solar panel mounting configurations.

Certain embodiments are directed to a solar panel mounting system for mounting a solar panel onto a support structure. In certain embodiments, the solar panel mounting system comprises at least one mounting foot configured to be fastened against the support structure; at least one mount adapter adjustably fastened against the mounting foot; a mounting rail clamped between a portion of the mount adapter and a portion of the mounting foot, wherein the mounting rail has an interior surface defining an internal channel extending along a length of the mounting rail; and at least one channel nut configured to accept a fastener and to engage an interior surface of the mounting rail to secure the solar panel relative to the mounting rail.

In certain embodiments, the mounting rail defines at least one mounting feature; and the mount adapter defines at least one connecting member configured to engage the at least one mounting feature to clamp the mounting rail against the mounting foot. Moreover, the mounting rail may have an open top side extending into the internal channel, and wherein the at least one mounting feature extends away from a closed bottom side of the mounting rail. In certain embodiments, a first side of the mount adapter is adjustably fastened against the mounting foot, and the at least one connecting member extends away from a second side of the mount adapter, wherein the second side is at least substantially perpendicular to the first side. The mount adapter may be secured against a first side of the mounting foot at a mount position, and wherein the mount position is adjustable along at least a portion of a length of the first side of the mounting foot. Moreover, in various embodiments, the mounting foot defines a slot having a length parallel with the length of the first side of the mounting foot, and wherein the mount adapter is secured against the mounting foot via a fastener extending through the slot.

In certain embodiments, the mounting rail comprises a first mounting rail, and the solar panel mounting system may further comprise a second mounting rail; a rail splice securing the first mounting rail relative to the second mounting rail in an end-to-end configuration. The rail splices may frictionally engages the interior surface of the first rail and an interior surface of the second rail. In various embodiments, the rail splice frictionally engages an exterior surface of the first mounting rail and an exterior surface of the second mounting rail. In certain embodiments, the first mounting rail defines at least one first mounting feature and the second mounting rail defines at least one second mounting feature, and wherein the rail splice engages the at least one first mounting feature and the at least one second mounting feature. Moreover, each of the mounting foot, mount adapter, and mounting rail may comprise aluminum.

Certain embodiments are directed to a method for mounting a solar panel to a support structure. The method may comprise securing a mounting foot against the support structure; loosely fastening a mount adapter against the mounting foot; engaging a mounting rail with at least a portion of the mount adapter; tightening the mount adapter against the mounting foot to clamp the mounting rail between the at least a portion of the mount adapter and the mounting foot; positioning a channel nut within an interior channel of the mounting rail such that the channel nut engages an interior surface of the mounting rail; and fastening the solar panel to the channel nut to secure the solar panel relative to the mounting rail.

In certain embodiments, the mounting rail defines at least one mounting feature and the mount adapter defines at least one connecting member configured to engage the at least one mounting feature; and wherein engaging the mounting rail with the at least a portion of the mount adapter comprises engaging the mounting feature and the connecting member. Moreover, the mount adapter is configured for adjustable mounting relative to the mounting foot, and wherein the method may further comprise leveling the mounting rail by adjusting the mount adapter relative to the mounting foot. In various embodiments, the mounting foot defines a slot extending therethrough and the mount adapter is fastened against the mounting foot via a fastener extending through the slot, and wherein leveling the mounting rail may comprises adjusting a position of the mount adapter and the fastener relative to the slot. In certain embodiments, the mounting rail is embodied as a first mounting rail, and wherein the method may further comprise securing a rail splice relative to a first end of the first mounting rail; and securing a second mounting rail relative to the rail splice to secure the first mounting rail and the second mounting rail in an end-to-end configuration.

In certain embodiments, securing the rail splice relative to the first end of the first mounting rail comprises frictionally engaging the rail splice with the interior surface of the first mounting rail. Moreover, securing the rail splice relative to the first end of the first mounting rail comprises frictionally engaging the rail splice with an exterior surface of the first mounting rail. In various embodiments, the first mounting rail comprises at least one mounting feature, and wherein securing the rail splice relative to the first end of the first mounting rail comprises engaging the rail splice with the at least one mounting feature.

BRIEF DESCRIPTION OF THE SEVERAL VIEWS OF THE DRAWINGS

Reference will now be made to the accompanying drawings, which are not necessarily drawn to scale, and wherein:

FIGS. 3A-3B are side views of alternative mounting bracket configurations according to various embodiments;

FIGS. 4A-4C are side views of a mounting bracket and mounting rail at various stages of assembly;

FIGS. 10A-10B are internal rail splices installed relative to respective size rails, respectively;

FIG. 13 is a perspective view of a preloaded internal rail splice being installed relative to a rail, according to various embodiments.

DETAILED DESCRIPTION

Figure 1:
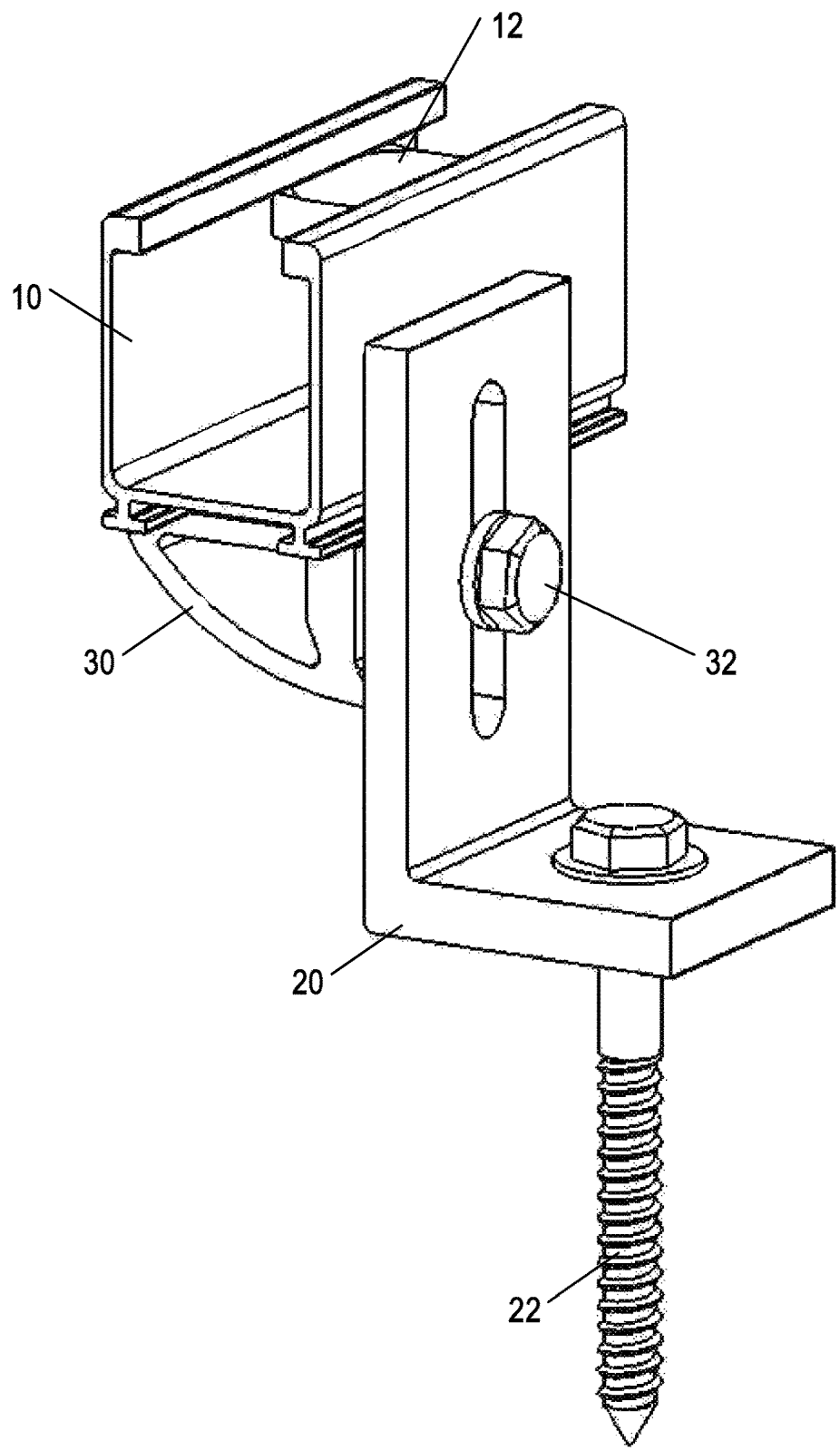
FIGS. 1-2 are perspective views of a mounting bracket secured to a mounting rail according to one embodiment.
Figure 2:
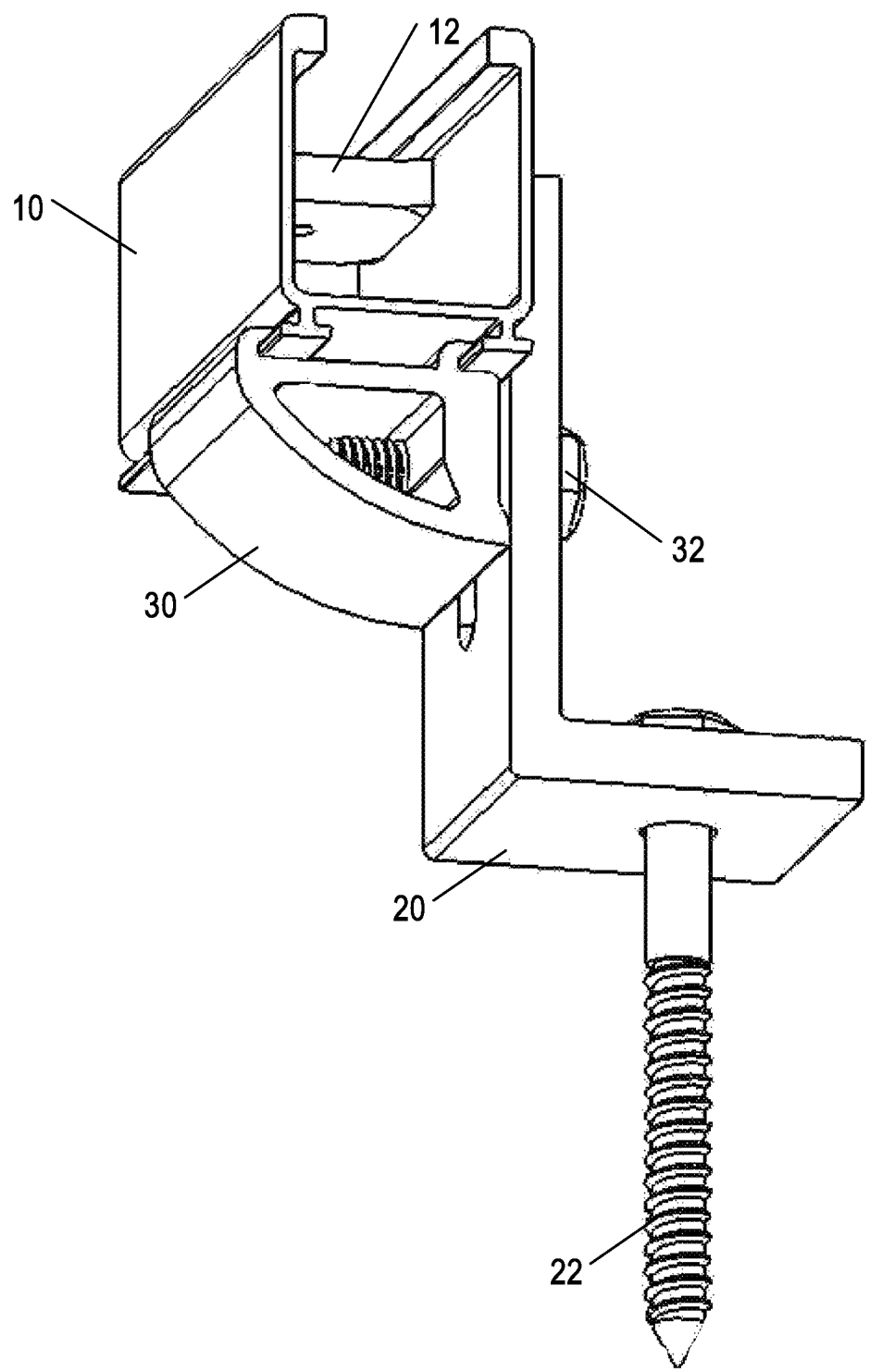
Figure 5A:
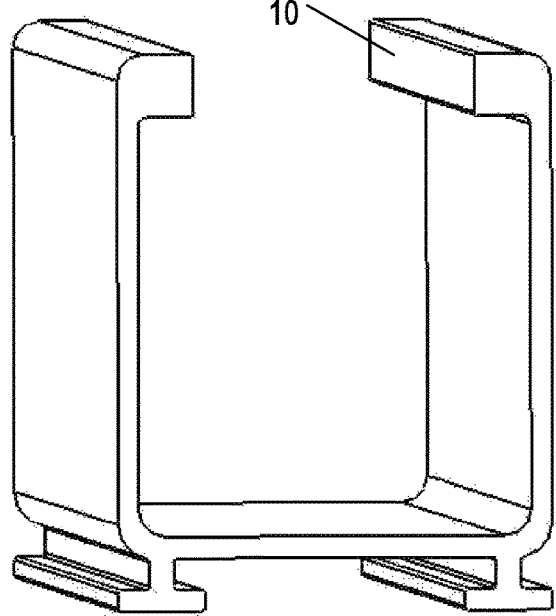
FIGS. 5A-5B are perspective views of various size rails according to certain embodiments.
Figure 5B:
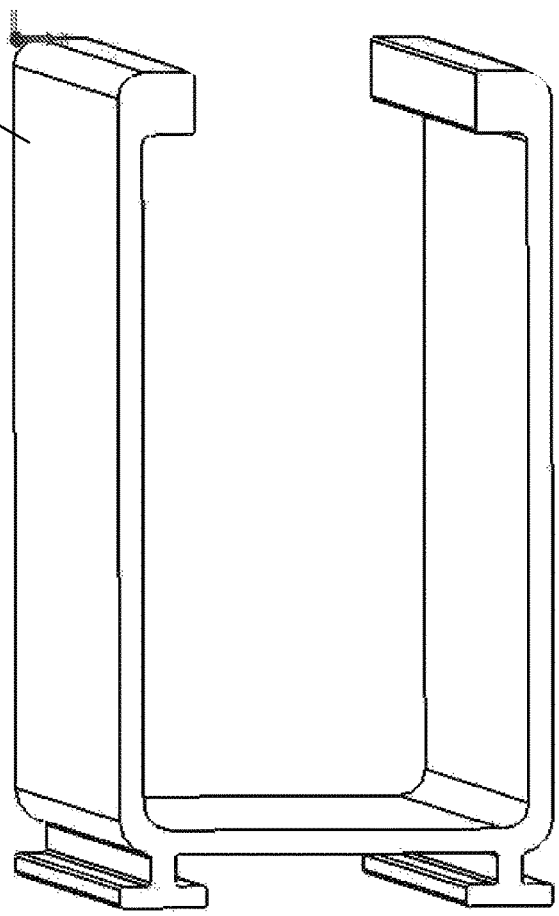
Figures 6A, 6B:
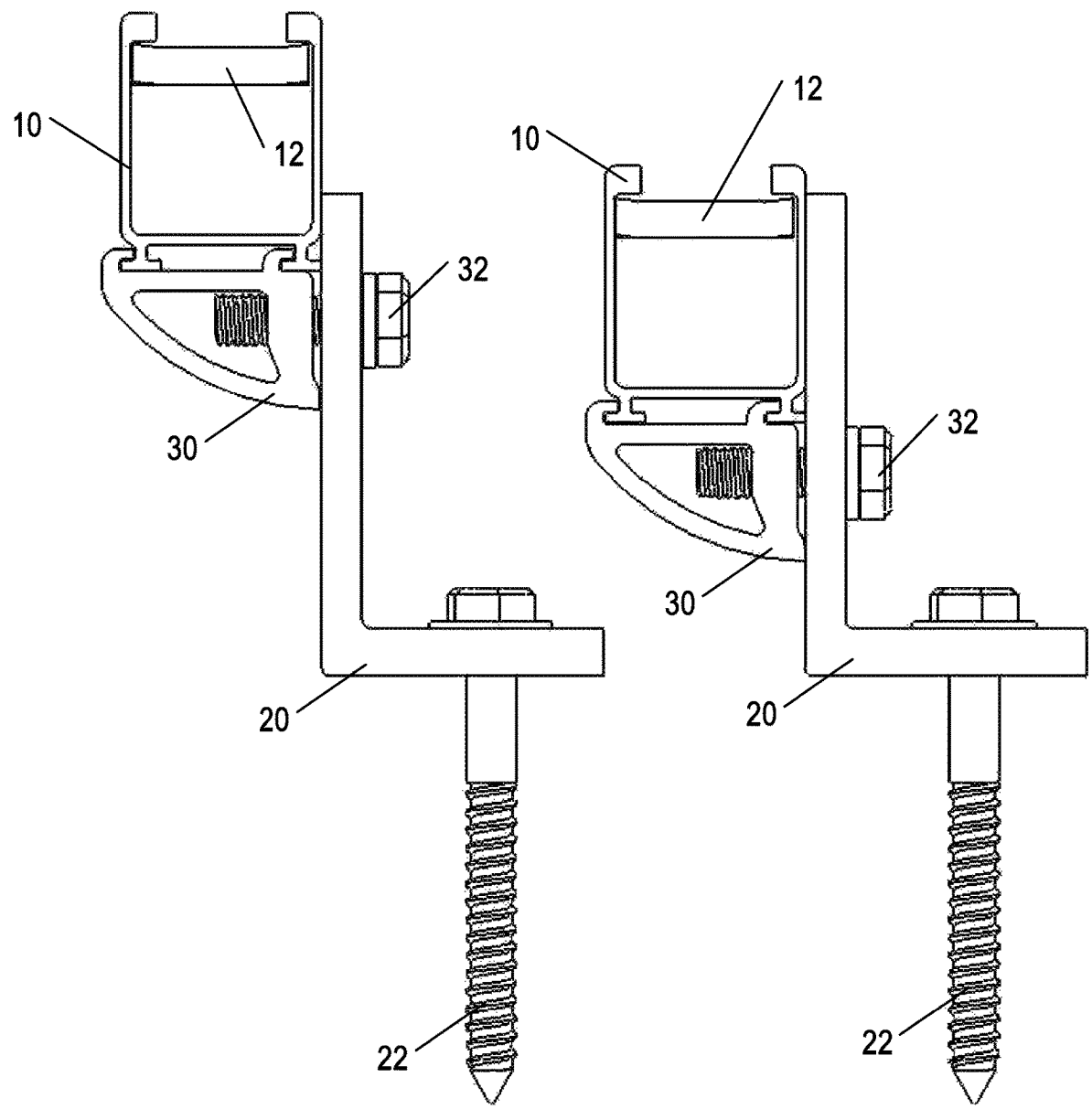
FIGS. 6A-6B are side views of a mounting bracket having a rail secured at an upper position and a lower position relative to the mounting foot, respectively.
Figure 7B:
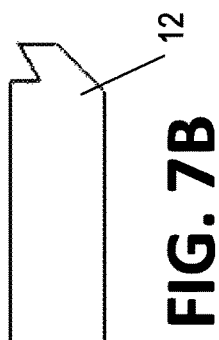
FIGS. 7A-7B are alternative channel nut configurations according to various embodiments.
Figure 7D:
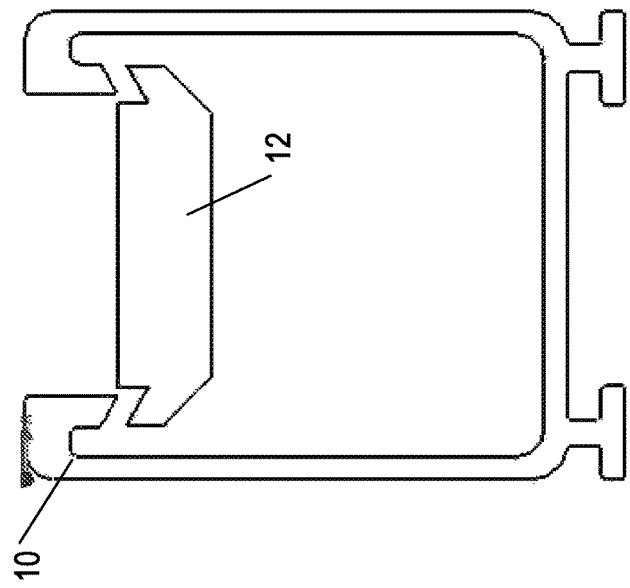
FIGS. 7C-7D are alternative channel nut configurations installed in rails according to various embodiments.
Figure 7A:
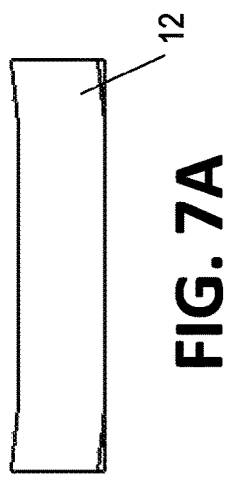
Figure 7C:
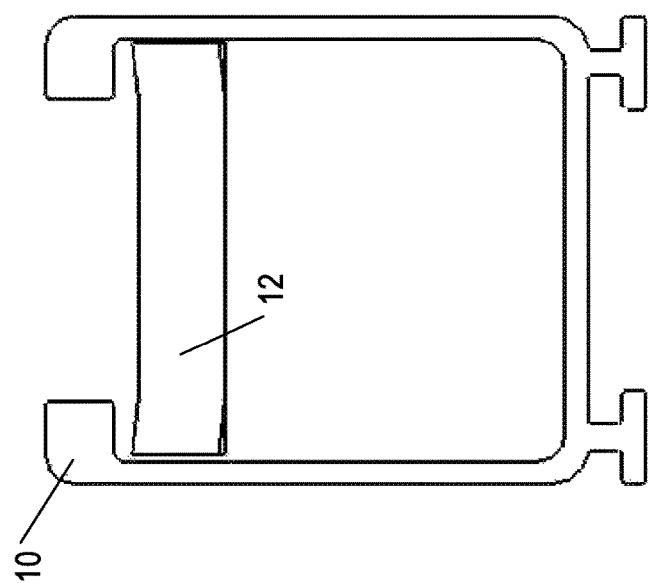
Figure 8A:
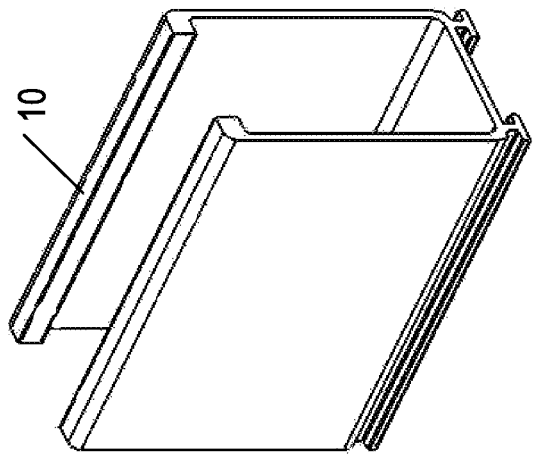
FIGS. 8A-8B are external rail splices installed relative to respective size rails, respectively.
Figure 8B:
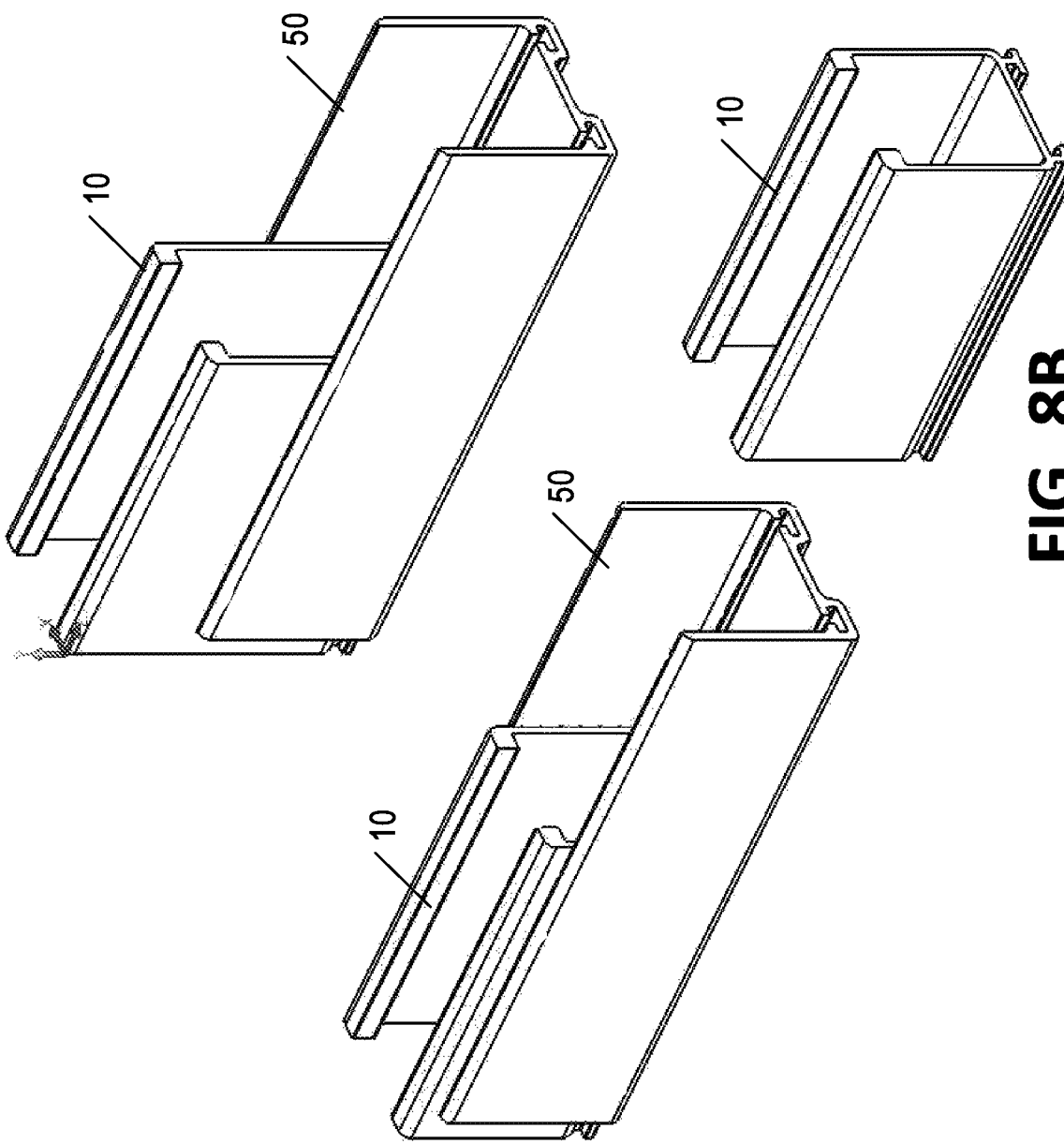
Figure 9B:
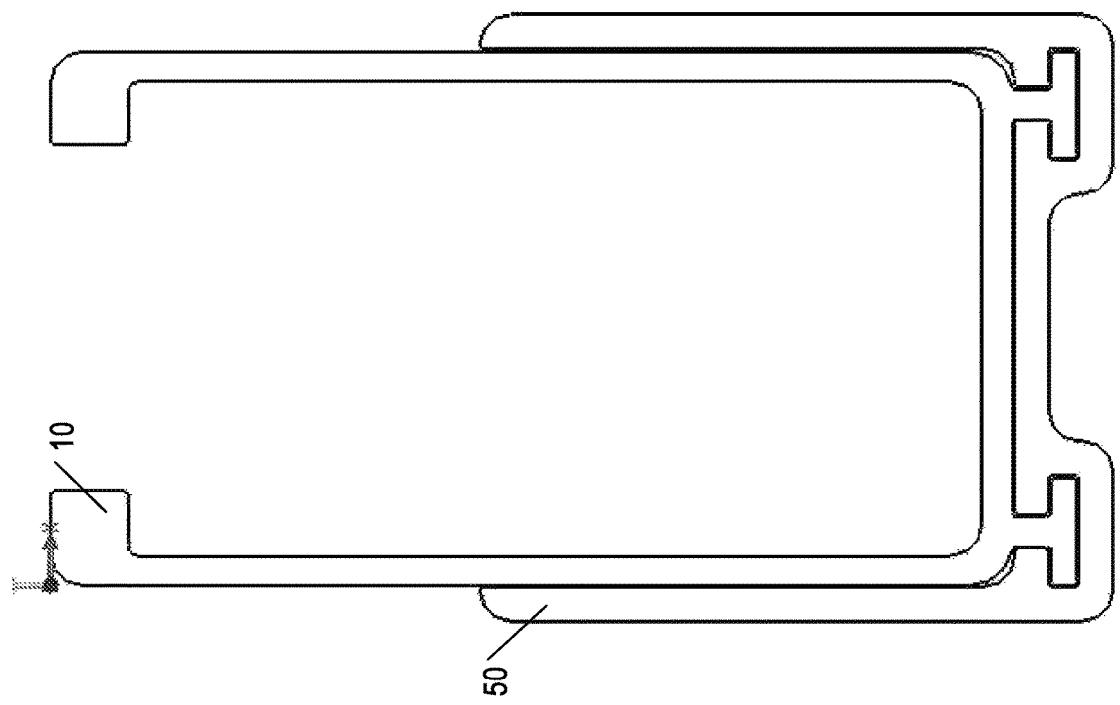
FIGS. 9A-9B are end-views of various size rails installed within external rail splices, respectively.
Figure 9A:
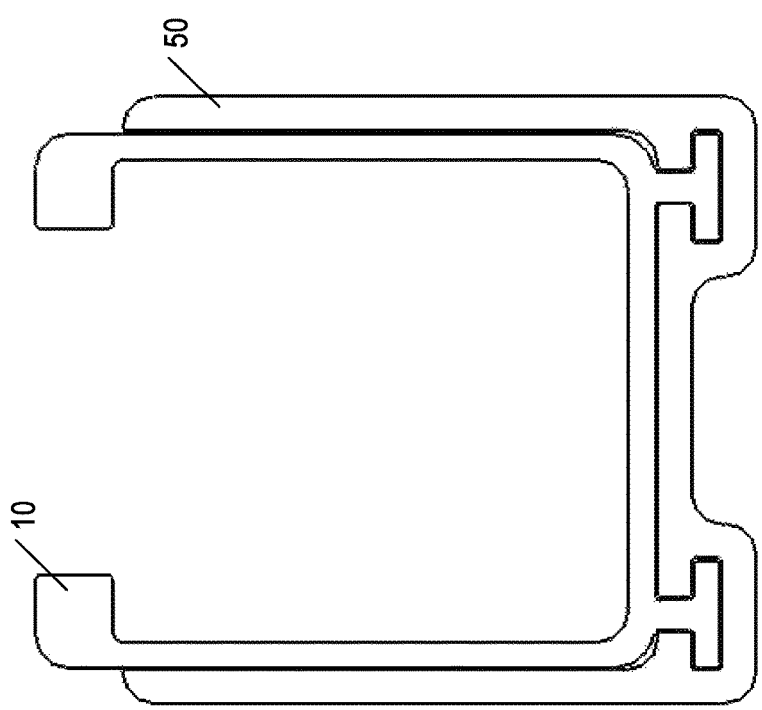
Figure 11A:
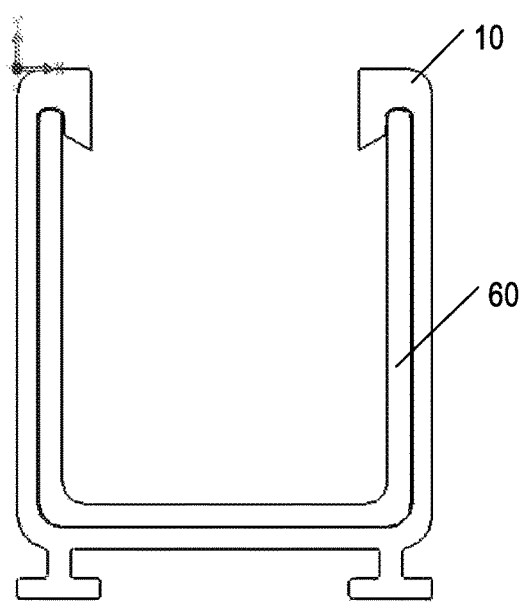
FIGS. 11A-11B are end-views of various size rails installed relative to internal rail splices, respectively.
Figure 11B:
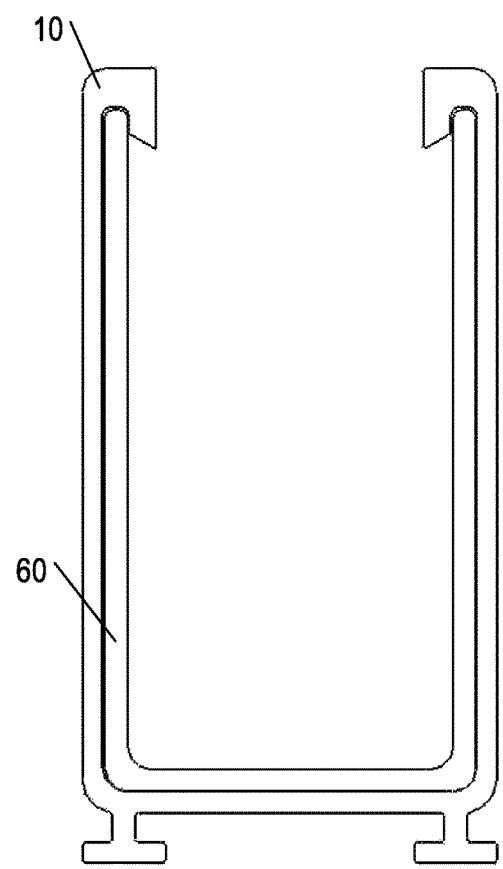
Figure 12B:
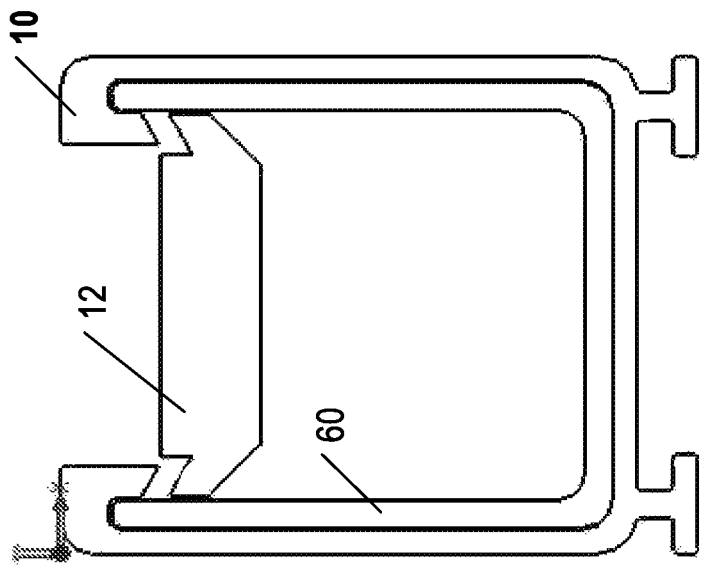
FIGS. 12A-12B are end-views of rails having rail nuts and rail splices installed according to various embodiments.
Figure 12A:
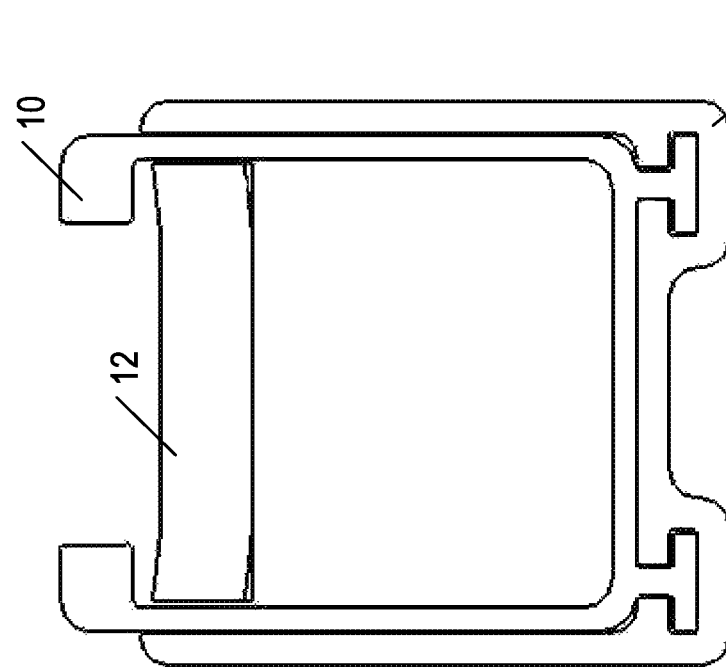
Figure 14:
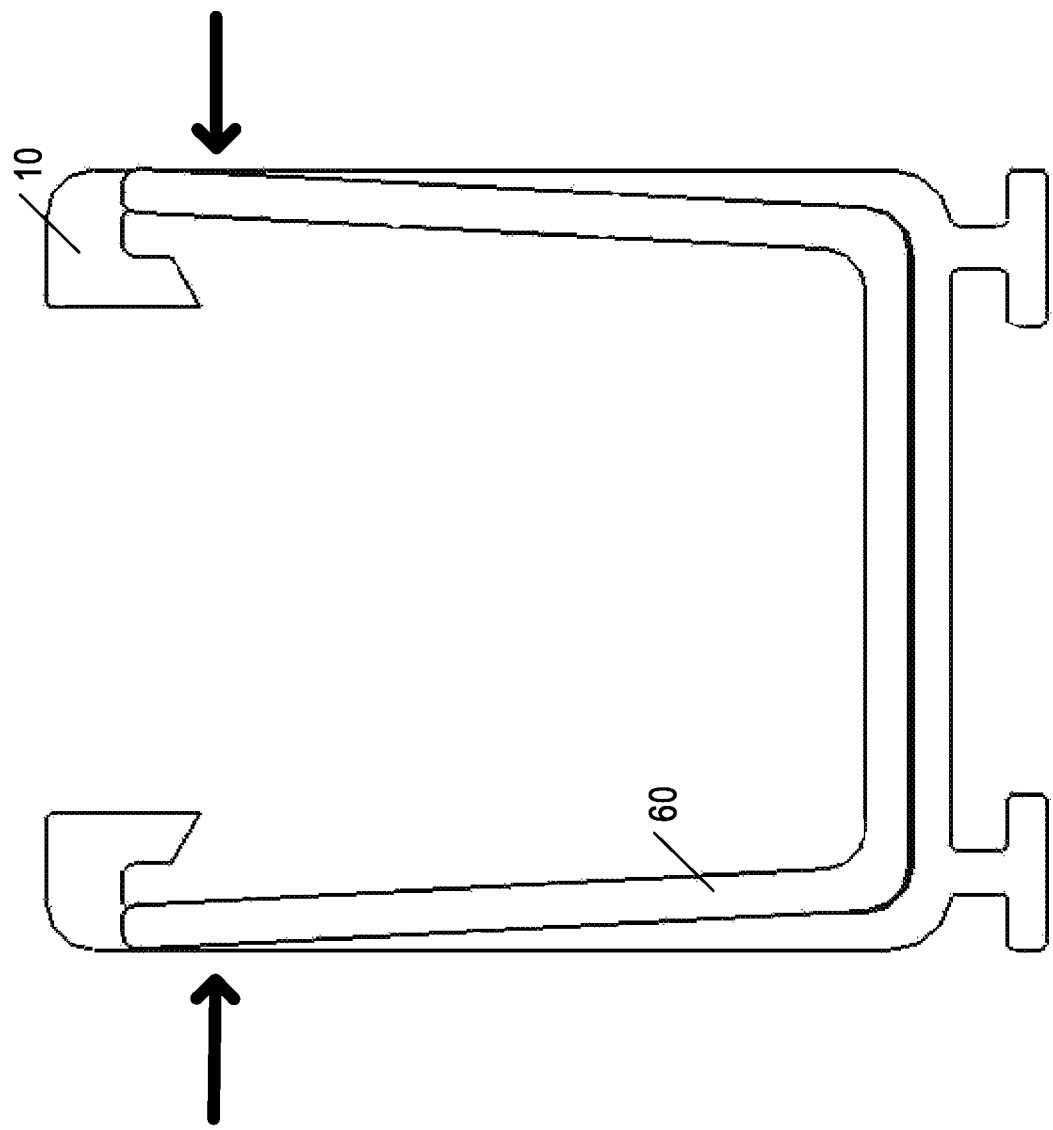
FIG. 14 is an end-view of a preloaded internal rail splice being installed relative to a rail, according to various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood that the terms of direction provided within this disclosure are provided merely for purposes of convenience relative to the orientation of the configurations shown in the attached figures. Accordingly, while the terms "vertical" and "horizontal" are provided in reference to the orientation of the various configurations shown in the figures, it should be understood that these directions are provided merely to ease the discussion of the functionality of the described configurations, however it should be understood that the described configurations may be provided in any orientation. Indeed, the described solar panel mounting configurations may be utilized to mount solar panels relative to supportive structures configured at any angle relative to horizontal. For example, the described configurations may be secured relative to entirely horizontal building roofs, pitched building roofs between 0-90 degrees, or entirely vertical building walls, as non-limiting examples.

Various embodiments are directed to rail-based mounting systems for securing solar panels relative to supportive structures (e.g., roofs). As shown in the attached figures, rails 10 may be utilized to secure solar panels to a support surface. The rails 10 may be aluminum extruded rails having a mill finish (e.g., no coating), an anodized finish, a painted finish, and/or the like. In certain embodiments, the rails 10, various components of the mounting mechanism, and/or the rail splices discussed herein may comprise an electrically conductive material that may be used to connect the components relative to electrical ground. However it should be understood that any of a variety of materials may be utilized, including, for example, stainless steel, carbon steel, titanium, and/or the like. Moreover, be the rails may be formed by any of a variety of manufacturing mechanisms, such as extrusion, forging, casting, milling, and/or the like.

Those rails 10 may be specifically configured to accept one or more channel nuts 12 that are specifically configured to be secured relative to the one or more solar panels. The channel nuts may comprise a fastener portion (e.g., a through hole, a threaded through hole, a nut, and/or the like) configured to engage corresponding fastener portions secured to the solar panel, such that the solar panels may be secured relative to the rails 10. Moreover, as shown in the attached figures, the channel nuts 12 may be configured to engage portions of the rails 10 such that the channel nuts 12 do not become dislodged from the rails 10 when a solar panel is secured thereto.

The rails 10 may be secured relative to a supportive structure via a mounting mechanism comprising a mounting foot 20 and mount adapter 30. As shown in the figures, the rails 10 comprise mounting features (e.g., L-shaped extrusions, T-shaped extrusions, and/or the like) configured to engage corresponding connecting members of the mount adapter 30. In the illustrated embodiments, the mounting features of the rails 10 comprise T-shaped extrusions extending away from a bottom surface of the rail 10, opposite a portion of the rail to be secured adjacent a solar panel. Those rail mounting features are configured to engage U-shaped connecting members of the mount adapter 30 such that the rail 10 is prevented from moving vertically away from the mount adapter 30 or laterally in a first direction relative to the mount adapter 30. As shown in the figures, to secure the rail 10 relative to the mounting mechanism, a bolt 32 or other fastener mechanism may be used to secure/fasten the mount adapter 30 relative to the mounting foot 20 (shown as an L-shaped foot, however it should be understood that any of a variety of mounting foot styles may be utilized, including composition roof mounts, standoff mounts, metal roof mounts, tile roof hooks, tile replacement mounts, and/or the like), thereby pulling the rail 10 toward and into contact with a portion of the mounting foot 20. When the mount adapter 30 is tightly secured relative to the mounting foot 30 while the rail 10 is secured relative to the mount adapter 30, the rail is prevented from moving laterally between the U-shaped connecting members of the mount adapter 30 and the portion of the mounting foot 20. A sidewall of the rail 10 is thus in contact with the portion of the mounting foot 20, thereby frictionally engaging the rail 10 with the mounting foot 20. Thus, the rail is securely attached relative to the mounting mechanism such that the rail is prevented from moving relative to the mounting mechanism with the bolt 32 or other fastener securing the mounting foot 20, the mount adapter 30, and the rail 10 relative to one another as shown in the figures.

Moreover, as shown in the figures, the mounting foot 20 may be secured relative to (e.g., fastened against) a surface of a supportive structure (e.g., a roof) via a fastener 22 (e.g., a lag bolt, a screw, a nail, a bolt and nut combination, a rivet, a welded joint, and/or the like).

The rails 10 have a cross-sectional profile optimized for strength, wire management, and robust connection to the mounting mechanism while still allowing for easy leveling of the rails 10. As shown in the figures, the mount adapter 30 is adjustably fastened against the mounting foot 20 at a mount position, thereby enabling the mount adapter 30 to be vertically movable (e.g., by changing the mount position) relative to the mounting foot 20 by moving the bolt 32 or other fastener within the shown vertical slot within the portion of the mounting foot 20. Moving the bolt 32 or other fastener within the shown vertical slot moves the mount position of the mount adapter 30 relative to the mounting foot 20.

Moreover, as shown in the figures, the rails may have any of a variety of heights that may be optimized for particular load conditions. In certain embodiments, a relatively taller rail may provide optimal structural performance (e.g., requiring fewer mounting mechanism assemblies) in high load regions, and a relatively shorter rail may provide optimal structural performance and cost effectiveness in regions with lower loads. As specific examples, the rails 10 may have an overall height between about 1 inch and 6 inches and an overall width between about 1 inch or more (e.g., as a specific example, the rails 10 may have a width of at least about 1 inch).

The rails 10 have a channel profile extending therethrough along the length of the rail 10 (e.g., for cable management) and bounded by an interior surface. The rails 10 further have at least two T-shaped features extending away from and along a bottom exterior surface of the rail 10, as discussed above for quick and easy mounting of the rail. In certain embodiments, the rails 10 may be secured relative to the mounting mechanisms without any drilling through the rails.

Mounting of the rails 10 relative to the mounting mechanism (and the supportive surface) utilizes a mount adapter 30 having at least two U-shaped hooks configured to engage the corresponding T-shaped features of the rails. The mount adapter 30 captures the rail 10 against a surface (e.g., a vertical surface) of the mounting foot 20, for example via a bolt 32 extending through a slot in the mounting foot 20 into a corresponding fastener accepting feature (e.g., a threaded through-hole) within the mount adapter 30.

Installation of a rail 10 relative to a mounting mechanism (and a supportive structure) may be provided by first pre-installing the mounting mechanism relative to the supportive structure. As noted above, the mounting foot 20 may be secured relative to the supportive structure via any of a variety of fasteners 22. The mounting mechanism is also loosely assembled by loosely securing the mount adapter 30 relative to the mounting foot 20 via bolt 32 (or other fastener). The rail 10 is then lowered onto the upper surface of the mount adapter 30, and the bolt 32 is then tightened to pull the mount adapter 30 (and the rail 10) toward the mounting foot 20. Pulling the mount adapter 30 toward the mounting foot 20 causes the described hooks of the mounting adapter 30 to engage corresponding T-shaped features of the rail 10 and to clamp the rail between the described hooks and a portion of the mounting foot 20.

Once the rail 10 is captured within the mounting mechanism, the rail may be leveled by moving the rail and the mount adapter 30 vertically, such that the bolt 32 slides within the included slot of the mounting foot 20 between the upper position and the lower position as shown in the figures. Once the rail 10 is level or is provided in a desired position relative to the mounting foot 20, the bolt 32 is tightened to rigidly secure the rail 10 and the mount adapter 30 relative to the mounting foot 20.

As shown in the figures, the mount adapter 30 may have any of a variety of shapes and/or sizes, such as the hollow "D"-shaped configuration or "L"-shaped configuration shown in the figures. It should be understood that these illustrations are provided for exemplary purposes only, and the mount adapter 30 may have shapes and sizes other than those illustrated.

As mentioned, modules (e.g., portions of solar panels, solar panel inverters, battery packs, cable ties, and/or the like) may be clamped onto the rails 10 via module clamps that are secured (e.g., bolted) onto channel nuts 12 secured within a top portion of the rail 10. The channel nuts 12 may have a generally rectangular shape such that opposite sides of the channel nuts 12 provide an interference fit with portions of the rail 10 on opposite sides of an upper rail opening. However, as shown in the figures, the channel nuts 12 may have other, complex shapes configured to interlock at least partially with corresponding features of the rail 10 to provide enhanced structural integrity of the rail and the interlocking nature of the channel nut 12.

Rail splicing (e.g., securing multiple rails 10 relative to one another in an end-to-end configuration) may be provided via rail splice members configured to be secured relative to a plurality of rails 10. The rail splices may be configured of aluminum or another electrically conductive material having sufficient structural support to secure multiple rails 10 relative to one another.

As shown in the figures, the rail splices may be embodied as external rail splices 50 configured to be secured relative to ends of multiple rails 10. The external rail splices 50 are configured to engage an exterior surface of each of the multiple rails 10. For example, the external rail splices 50 are configured to engage the T-shaped features on the bottom surface of the rails 10 to transfer mechanical load between multiple rail sections. Moreover, the external rail splices 50 may be utilized with rails 10 having various heights (e.g., short rails 10 and/or tall rails 10). Although not shown, the sidewalls of the external rail splices 50 may be biased (preloaded) toward an interior of the rail splice, such that the sidewalls impart a compressive force onto rails 10 inserted therein. To install the preloaded external rail splice 50 onto the rail 10, an installer may flex the sidewalls of the external rail splice 50 away from the interior of the rail splice and may insert the rail 10 within the interior of the external rail splice 50. Once the rail 10 is inserted into the external rail splice 50, the preloaded sidewalls contract inward, thereby providing a compressive force on the rails 10. The compressive force may create a stronger frictional bond between the external rail splice 50 and the included rails 10 to securely mount the multiple rails 10 relative to one another.

Moreover, although not shown, the external rail splices 50 may comprise one or more features compatible with a mounting mechanism as discussed herein. For example, the external rail splices 50 may have an integrated mount adapter 30 (such that the external rail splice 50 may be secured directly to the mounting foot 20) and/or may be configured to be secured relative to a mount adapter 30 in a manner similar to that discussed above.

Because the external rail splices 50 do not extend into the interior portion of the rails 10, the external rail splices 50 may be compatible with channel nuts 12 as discussed herein.

Alternatively, as shown in the figures, the rail splice may be embodied as an internal rail splice 60. The internal rail splice 60 may be configured to engage corresponding mounting features (e.g., mounting features positioned at a top portion of the rail 10, in a sidewall of the rail 10, and/or the like). Accordingly, in certain embodiments the internal rail splices 60 may be configured for use with a specific size (e.g., height) rail 10, as shown in the attached figures. In various embodiments, internal rail splices 60 having sidewall heights corresponding to specific rail sizes may more naturally match the rail strength. Moreover, the internal rail splice 60 does not extend to the exterior of the attached rails 10, and accordingly the internal rail splices 60 do not interfere with the described features for securing a rail relative to a mounting mechanism.

In certain embodiments, the sidewalls of the internal rail splices 60 may be biased (preloaded) away from an interior of the rail splice, such that the sidewalls impart a compressive force onto rails 10 when inserted therein. To install the preloaded internal rail splice 60 within the rail 10, an installer may flex the sidewalls of the internal rail splice 60 toward the interior of the rail splice and may insert the internal rail splice 60 within the interior of the rail 10. Once the internal rail splice 60 is inserted into the rail 10, the preloaded sidewalls expand outward, thereby providing a compressive force on the rails 10. The compressive force may create a stronger frictional bond between the internal rail splice 60 and the rails 10 to securely mount the multiple rails 10 relative to one another.

Moreover, because the internal rail splices 60 are located within the interior portion of the rails 10, specially configured channel nuts 12 may be provided to be secured relative to the rails 10 at a location adjacent the internal rail splices 60.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A solar panel mounting system for mounting a solar panel onto a support structure, the solar panel mounting system comprising:
    at least one mounting foot configured to be fastened against the support structure, wherein the mounting foot comprises at least one planar side;
    a mount adapter having a first side including a first planar surface at a bottom end of the first side that is adjustably fastened against the at least one planar side of the mounting foot and a second planar surface at a top end of the first side and extending substantially perpendicular from a second side of the mount adapter;
    a mounting rail defining an exterior surface and an interior surface, wherein the mounting rail is clamped between a portion of the mount adapter and a portion of the mounting foot, wherein the interior surface defines an internal channel extending through a top portion of the mounting rail and along a length of the mounting rail, wherein the interior surface is substantially symmetrical across the internal channel, wherein the top portion of the mounting rail is at least substantially perpendicular to a side portion of the exterior surface of the mounting rail, and wherein the mounting rail defines a plurality of mounting features, each having a T-shape and extending from the exterior surface; and
    at least one channel nut configured to accept a fastener and to engage the interior surface defining the internal channel of the mounting rail to secure the solar panel relative to the top portion of the mounting rail;
    wherein the second planar surface is spaced apart from the at least one planar side of the mounting foot while the side portion of the exterior surface of the mounting rail is pressed against the at least one planar side and at least one mounting feature is pressed against the at least one planar side of the mounting foot; and
    wherein the mount adapter comprises a plurality of connecting members extending in a first direction away from the second side of the mount adapter, each of the connecting members being configured to engage a respective mounting feature of the plurality of mounting features extending from the exterior surface of the mounting rail.

2. The solar panel mounting system of claim 1, wherein the mounting rail has an open top side extending into the internal channel, and wherein the plurality of mounting features extend away from a closed bottom side of the mounting rail.

3. The solar panel mounting system of claim 1, wherein the mount adapter is secured against the at least one planar side of the mounting foot at a mount position, and wherein the mount position is adjustable along at least a portion of a length of the at least one planar side of the mounting foot.

4. The solar panel mounting system of claim 3, wherein the mounting foot defines a slot having a length parallel with the length of the at least one planar side of the mounting foot, and wherein the mount adapter is secured against the mounting foot via a second fastener extending through the slot.

5. The solar panel mounting system of claim 1, wherein the mounting rail comprises a first mounting rail, and wherein the solar panel mounting system further comprises:
    a second mounting rail; and
    a rail splice securing the first mounting rail relative to the second mounting rail in an end-to-end configuration.

6. The solar panel mounting system of claim 5, wherein the rail splice frictionally engages the interior surface of the first mounting rail and an interior surface of the second mounting rail.

7. The solar panel mounting system of claim 5, wherein the rail splice frictionally engages an exterior surface of the first mounting rail and an exterior surface of the second mounting rail.

8. The solar panel mounting system of claim 5, wherein the plurality of mounting features defined by the mounting rail includes at least one first mounting feature and the second mounting rail defines at least one second mounting feature, and wherein the rail splice engages the at least one first mounting feature and the at least one second mounting feature.

9. The solar panel mounting system of claim 1, wherein each of the mounting foot, mount adapter, and mounting rail comprise aluminum.

10. A solar panel mounting system for mounting a solar panel onto a support structure, the solar panel mounting system comprising:

at least one mounting foot configured to be fastened against the support structure wherein the mounting foot comprises at least one planar side;

a mount adapter having a first side including a first planar surface at a bottom end of the first side that is adjustably fastened against the at least one planar side of the mounting foot and a second planar surface at a top end of the first side and extending substantially perpendicular from a second side of the mount adapter, wherein the mount adapter comprises a plurality of connecting features extending in a first direction away from a second side of the mount adapter;

a mounting rail defining an exterior surface and an interior surface, wherein the interior surface defines an internal channel extending through a top portion of the mounting rail and along a length of the mounting rail, wherein the interior surface is substantially symmetrical across the internal channel, and wherein the exterior surface of the mounting rail defines a plurality of mounting features, each having a T-shape and extending from the exterior surface; and at least one channel nut configured to accept a fastener and to engage the interior surface defining the internal channel of the mounting rail to secure the solar panel relative to the top portion of the mounting rail;

wherein the second planar surface is spaced apart from the at least one planar side of the mounting foot while a side portion of the exterior surface of the mounting rail is pressed against the at least one planar side and at least one mounting feature is pressed against the at least one planar side of the mounting foot;

wherein the plurality of connecting features of the mount adapter are each configured to engage a respective one of the plurality of mounting features defined by the exterior surface of the mounting rail to secure at least the side portion of the exterior surface of the mounting rail relative to the mounting foot; and wherein the top portion of the mounting rail is at least substantially perpendicular to the side portion of the exterior surface of the mounting rail.

11. The solar panel mounting system of claim 2, wherein the open top side faces in a first surface direction, the closed bottom side faces in a second surface direction opposite the first surface direction, and the each of the connecting members is configured to engage the respective mounting feature by pressing against the respective mounting feature in a third direction that is substantially perpendicular to both the first surface direction and the second surface direction.

12. A solar panel mounting system for mounting a solar panel onto a support structure, the solar panel mounting system comprising:

at least one mounting foot configured to be fastened against the support structure wherein the mounting foot comprises at least one planar side;

a mount adapter having a first side including a first planar surface at a bottom end of the first side that is adjustably fastened against the at least one planar side of the mounting foot and a second planar surface at a top end of the first side and extending substantially perpendicular from a second side of the mount adapter;

a mounting rail defining an exterior surface and an interior surface, wherein the mounting rail is clamped between a portion of the mount adapter and a portion of the mounting foot, wherein the interior surface defines an internal channel extending through a top portion of the mounting rail and along a length of the mounting rail, wherein the interior surface is substantially symmetrical across the internal channel and, wherein the mounting rail defines a plurality of mounting features extending from the exterior surface; and at least one channel nut configured to accept a fastener and to engage the interior surface defining the internal channel of the mounting rail to secure the solar panel relative to the top portion of the mounting rail;

wherein the second planar surface is spaced apart from the at least one planar side of the mounting foot while a side portion of the exterior surface of the mounting rail is pressed against the at least one planar side and at least one mounting feature is pressed against the at least one planar side of the mounting foot; and wherein the mount adapter comprises a plurality of connecting members, each of the connecting members being configured to engage a respective mounting feature of the plurality of mounting features extending from the exterior surface of the mounting rail.

\* \* \* \* \*